United States Patent [19]

Bielis et al.

[11] Patent Number: 5,163,248
[45] Date of Patent: Nov. 17, 1992

[54] ONE-PIECE MODULAR DOOR FRAME GLASS RUN CHANNEL

[75] Inventors: John C. Bielis, Livonia; Kenneth D. Schell, Warren; Cleatis W. Yarger, Washington, all of Mich.

[73] Assignee: General Motors Corporation, Detroit, Mich.

[21] Appl. No.: 754,102

[22] Filed: Sep. 3, 1991

[51] Int. Cl.⁵ .............................................. E06B 7/16
[52] U.S. Cl. ......................................... 49/441; 49/489
[58] Field of Search ................ 49/475, 482, 484, 488, 49/481, 479, 440, 441

[56] References Cited

U.S. PATENT DOCUMENTS

| | | | |
|---|---|---|---|
| 2,726,894 | 12/1955 | Bugbee | 296/44.5 |
| 4,584,150 | 4/1966 | Ballocca | 264/40.1 |
| 4,648,207 | 3/1987 | Shibasaki | 49/441 |
| 4,704,820 | 11/1987 | Kisanuki | 49/441 |
| 4,783,931 | 11/1988 | Kirkwood | 49/441 |
| 4,843,763 | 7/1989 | Mesnel | 49/440 |
| 4,910,919 | 3/1990 | Kisanuki et al. | 49/479 |
| 4,920,699 | 5/1990 | Nagaya et al. | 49/441 |
| 4,923,759 | 5/1990 | Brooks et al. | 428/521 |
| 4,951,418 | 8/1990 | Keys | 49/440 |
| 4,956,941 | 9/1990 | Vaughan | 49/440 |
| 5,010,689 | 4/1991 | Vaughan | 49/440 |
| 5,050,349 | 9/1991 | Goto et al. | 49/441 X |

FOREIGN PATENT DOCUMENTS 61-150820 7/1986 Japan.

*Primary Examiner*—Renee S. Luebke
*Assistant Examiner*—Jerry Redman
*Attorney, Agent, or Firm*—Raymond I. Bruttomesso, Jr.

[57] ABSTRACT

A window receiving assembly is carried by a frame of a vehicle door. A metallic channel has a mounting surface for mounting to the frame and a pair of side walls projecting from the mounting surface and defines a window receiving channel with an opening. The inboard side wall of the metallic channel has an edge rolled into the window receiving channel defining a lip and the outboard side wall consists of an upper portion in proximity to the mounting surface and a lower portion where the lower portion is rolled into the window receiving channel. A molding is extruded to the lower portion of the channel forming a sealing surface for engaging an exterior surface of the window. The sealing surface of the molding and the upper portion of the outboard side of the channel define a void where the window receiving channel widens compared to the opening. A filler is co-extruded with the molding onto the channel filling the space and is adapted to allow the channel to be bent to have a corner that fits the window without distortion and filler removed after bending to redefine the space. A weather-strip has a retaining portion received in the void and a tongue received by the lip for securing the weather-strip to the channel after the channel is bent to the shape of the window and mounted to the frame of the vehicle whereby the weather-strip is adapted to provide a seal with the window.

4 Claims, 2 Drawing Sheets

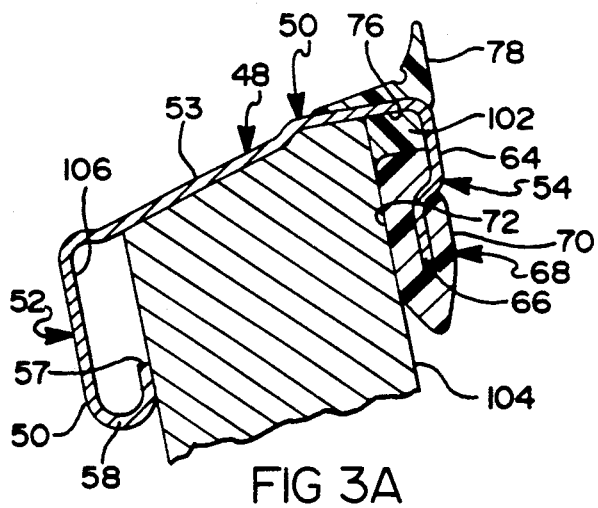
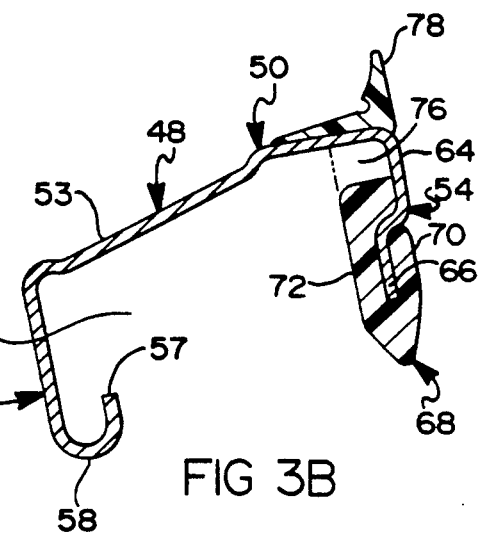
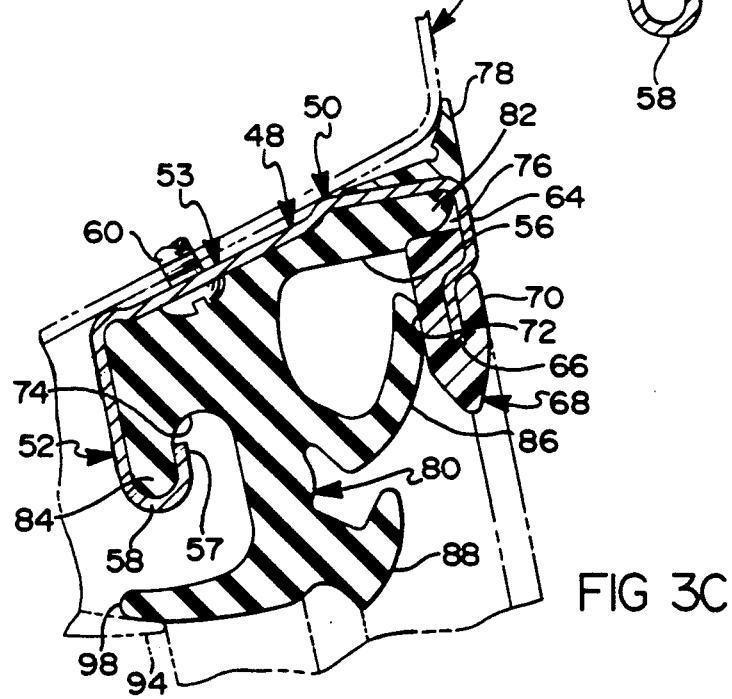

ONE-PIECE MODULAR DOOR FRAME GLASS RUN CHANNEL

This invention relates to a door frame glass run channel and more particularly to a rolled metal channel with an extruded plastic filler which allows for smooth bending of the channel to a shape which conforms to the contour of the window.

BACKGROUND OF THE INVENTION

It is known to have a vehicle with a door which includes a frame that surrounds a window opening. The frame holds a channel containing a weather-strip which receives the window. The channel is composed of rolled steel which conforms to the shape of the window. One method of achieving the proper shaped corner is to have the channel composed of rolled steel sections which are miter jointed and welded together at the corners. Alternatively, it is known to have the channel composed of an inboard section and an outboard section that are bent to the proper shape and then welded together. A third method is to manually install a separate flexible metallic filler into the portion of the channel which does not receive the bender support in order to bend without deformation.

It would be desirable to have a glass run channel composed of one rolled steel section with an extruded filler that can bend into the proper shape without the corners crimping or deforming.

SUMMARY OF THE INVENTION

This invention provides a window receiving assembly carried by a frame of a vehicle door. A metallic channel of rolled steel has a mounting surface for mounting to the frame and an inboard side wall and an outboard side wall projected from the mounting surface. The metallic channel defines a window receiving channel having an opening. The inboard side wall of the metallic channel has a first edge rolled into the window receiving channel defining a lip and the outboard side wall consisting of an upper portion located in proximity to the mounting surface and a lower portion where the lower portion is rolled into the window receiving channel. A plastic molding is extruded to the lower portion of the channel forming a sealing surface for engaging an exterior surface of the window. The sealing surface of the molding and the upper portion of the outboard side wall of the metallic channel define a space where the window receiving channel widens compared to the opening of the window receiving channel. A filler is co-extruded with the plastic molding onto the metallic channel filling the space and is adapted to allow the metallic channel to be bent to conform with the contour of the window without distortion. The filler is removed after bending to redefine the space. A weather-strip has a retaining portion received in the void and a tongue received by the lip of the metallic channel for securing the weather-strip to the metallic channel after the metallic channel is bent to the shape of the window and mounted to the frame of the vehicle whereby the weather-strip is adapted to provide a seal with an interior surface of the window and bias the window towards engagement with the sealing surface of the molding.

One object, feature and advantage resides in the provision of a metallic channel of rolled steel having a mounting surface for mounting to a frame and an inboard side wall and an outboard side wall projected from the mounting surface with the metallic channel defining a window receiving channel having an opening and the inboard side wall of the metallic channel having a first edge rolled into the window receiving channel defining a lip and the outboard side wall consisting of an upper portion located in proximity to the mounting surface and a lower portion where the lower portion rolls into the window receiving channel and a plastic molding is extruded to the lower portion of the channel forming a sealing surface for engaging an exterior surface of the window. The sealing surface of the molding and the upper portion of the outboard side wall of the metallic channel define a space where the window receiving channel widens compared to the opening of the window receiving channel. A filler is co-extruded with the plastic molding onto the metallic channel filling the space and is adapted to allow the metallic channel to be bent to conform with the contour of the window without distortion and is removed after bending to redefine the space.

Further objects, features and advantages of the present invention will become more apparent to those skilled in the art as the nature of the invention is better understood from the accompanying drawings and detailed description.

BRIEF DESCRIPTION OF THE DRAWINGS

FIG. 3A is a cross sectional view of the glass run channel with the filler.

FIG. 3B is a cross sectional view of the glass run channel with the filler extracted defining the void.

FIG. 3C is a cross sectional view of the glass run channel with the weather-strip.

DESCRIPTION OF THE PREFERRED EMBODIMENT

Figure 1:
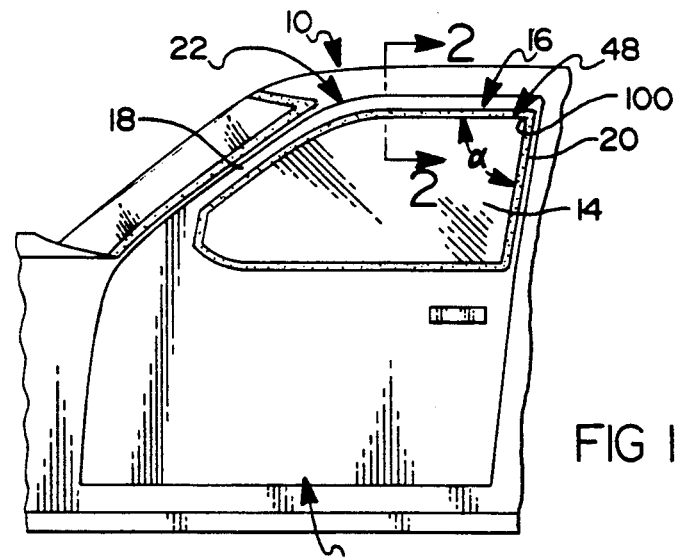
FIG. 1 is a perspective view of a glass run channel carried by a frame of a vehicle door according to the invention.

Referring to FIG. 1, a vehicle body 10 has a door 12 with a window 14 that moves between an open and closed position. The upper door frame 16 is of a generally inverted U-shaped configuration, as viewed in side elevation in FIG. 1, and comprises fore and aft sides 18 and 20, respectively, and a top 22. The top 22 is discussed in further detail related to the invention; however, the sides 18 and 20 are similar.

Figure 2:
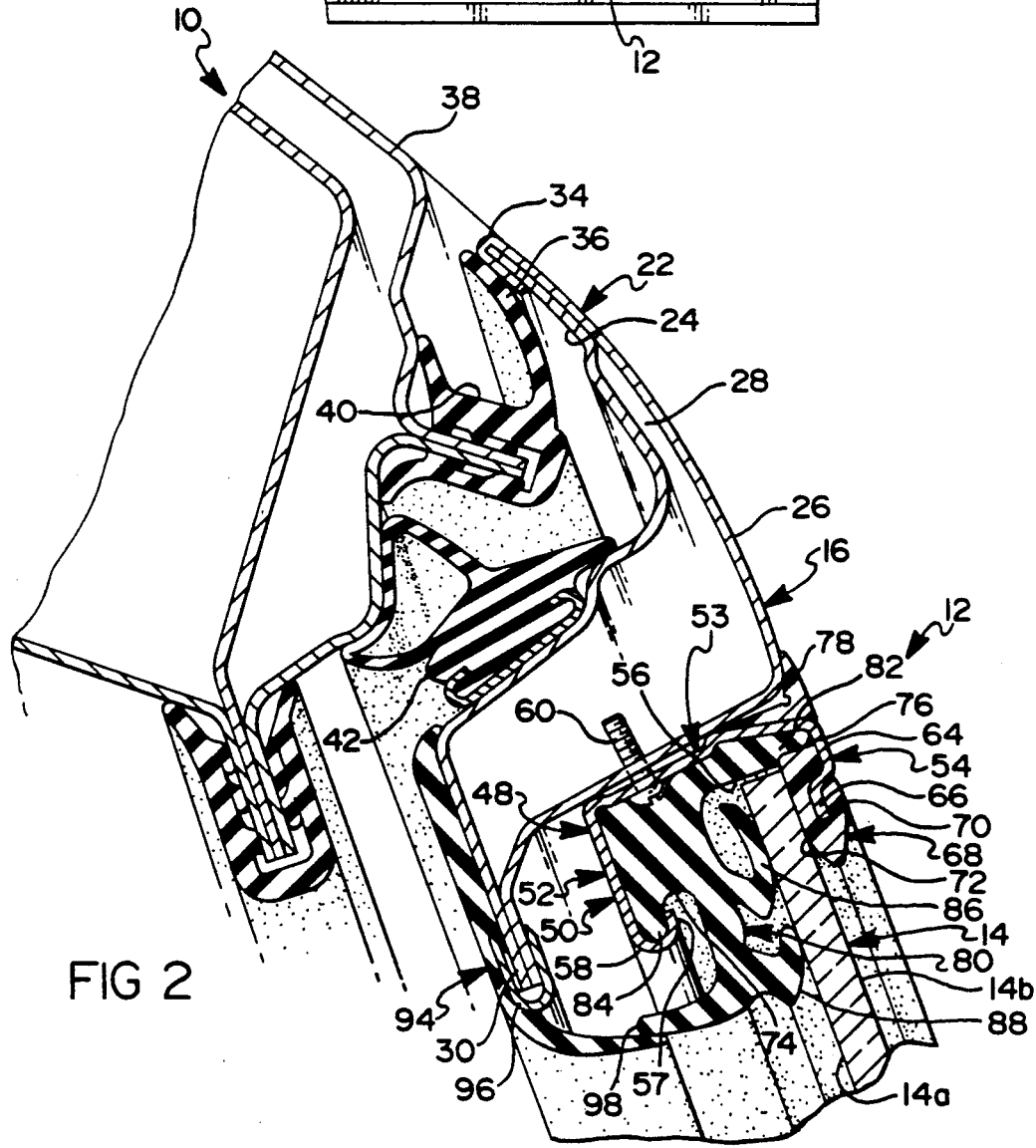
FIG. 2 is a cross sectional view taken in the direction of arrows 2—2 of FIG. 1.

As best shown in FIG. 2, the top 22 comprises inner and outer metal stampings 24 and 26 which are overlapped and joined together at their adjacent side edges to form a hollow center 28. The inboard joined together side edges of the inner and outer panels 24 and 26 define an inner flange 30 for the upper door frame 16. The inner flange 30 is spaced laterally inward from an interior surface 14a of the window 14.

Referring to FIG. 2, an upper edge portion 34 of the top 22 of the door frame 16 is adapted to engage a flexible seal 36 carried by a roof structure 38 when the door 12 is in a closed position which in addition defines a water drip channel 40.

A suitable one piece seal 42 carried by the inner panel 24 of the fore and aft sides 18 and 20, respectively, and the top 22 of the frame 16 engages the vehicle 10 to provide a continuous seal assembly when the door 12 is in the closed position, as best shown in FIG. 2.

Referring to FIG. 1, a glass run channel 48 of a generally inverted U-shaped configuration receives the window 14 and guides the window between the open and closed position. Referring to FIG. 2, the glass run channel 48 has metallic channel 50 made of a rolled steel section with an inboard side wall 52, a mounting surface 53 and an outboard side wall 54. The side walls 52 and 54 and the mounting surface 53 of the metallic channel 50 define a window receiving channel 56. The inboard side wall 52 has a first edge 57 that is rolled towards the window 14 to form a lip 58. The mounting surface 53 is secured to the outer panel 26 of the frame 16 by a plurality of screws 60, or other suitable means.

The outboard side wall 54 has an upper portion 64 and a lower portion 66, where the lower portion 66 is rolled to be spaced closer to an exterior surface 14b of the window 14 than the upper portion 64. A lower molding 68, made of polyvinyl chloride or other suitable material, is extruded to the lower portion 66 of the metallic channel 50 to form both a decorative surface 70 and a sealing surface 72 which seals with the exterior surface 14b of the window 14. The sealing surface 72 of the lower molding 68 and the lip 58 of the inboard side wall 52 define an opening 74 of the window receiving channel 56. The sealing surface 72 of the lower molding 68 and the upper portion 64 of the outboard side wall 54 define a space or packet 76 as best seen in FIG. 3B. In addition, a frame interface molding 78 is extruded to the mounting surface 53 of the metallic channel in the same process as the lower molding 68 and engages the outer panel 26 of the frame 16 giving a finished look.

Referring to FIG. 2, a weather-strip 80, made from a suitable rubber or elastomeric material, is secured in the window receiving channel 56 by a retaining portion 82 which is received in the void 76. The weather-strip 80 is also secured in the window receiving channel 56 by a tongue 84 which is received in the lip 58 of the inboard side wall 52 of the metallic channel 50. The weather-strip 80 includes a deflectable seal 86 which extends towards and is adapted to engage the interior surface 14a adjacent to the top edge, and a guiding seal 88 which extends toward the window 14 and is adapted to be deflected by the window 14. Both the deflectable seal 86 and the guiding seal 88 function to provide a seal between the top edge of the window 14 and to bias the window 14 towards engagement with the sealing surface 72 of the lower molding 68, in which position the exterior surface 14b of the window 14 will be substantially flush with decorating surface 70. The deflectable seal 86 and the guiding seal 88, respectively, engage the upper end of the window only when the latter is in its closed position.

An inner molding 94 is mounted to the inner flange 30 of the frame 16 by a plurality of clips 96 for covering the flange 30 to give the door 12 a finished look. A molding foot 98 of the weather-strip 80 partially overlies the inner molding 94.

The glass run channel 48 is manufactured in long strips of the rolled cross-section of FIG. 3A and bent to conform to the contour of the window 14. Referring to FIG. 1, the glass run channel 48 must be bent to form an angle α of approximately 90° to form a corner 100 molded to fit window 14. Referring to FIG. 3B, the glass run channel 48 has the space 76 which would result in the outboard side 62 of the metallic channel 50 crimping in the corner 100 if not filled during bending.

Referring back to FIG. 3A, a filler 102 is extruded on the previously rolled channel at the same time as lower molding 68 and the interface molding 78 and fills the space 76, while the glass run channel 48 is still in straight long strips. The filler 102 is a polypropylene or suitable material not compatible with the polyvinyl chloride lower molding 68 so that no cohesive band is formed thereby allowing for removal of the filler 102 later. A pull bender has a form similar in shape to the window 14 to shape the channel 50. A rail 104 of the pull bender is received in the window receiving channel 56. The ends of the length of metallic channel 50 are held by the pull bender and the glass run channel 48 is formed to have the proper shape which includes the corner 100.

Referring to FIG. 3B, after the glass run channel 48 is in the proper shape and removed from the pull bender, the filler 102, which does not bond to the lower molding 68, is removed from the window receiving channel 56 creating the space 76. Referring to FIG. 3C, after the glass run channel 48 is secured to the outer panel 26 by the screws 60, the weather-strip 80 is secured in the window receiving channel 56 by the retaining portion 82 being received by the space 76 and the tongue 84 being received in the lip 58 of the metallic channel 50.

Referring to FIG. 3A, deformation of the inboard side wall 52 could occur since a second void 106 is created where the rail 104 does not engage the side wall 52 because of the lip 58. However, the molding 94 and the weather-strip 80 hide the inboard side wall 52 from view; therefore, any deformation of the inboard side wall 52 would not effect appearance or function. A filler, however, could be co-extruded with the lower molding 68 and the interface molding 78 if deformation is not acceptable.

While one embodiment of the present invention has been explained, various modifications within the spirit and scope of the following claims will be readily apparent to those skilled in the art.

For example, a contour panel of a different material could be received by the channel instead of the window 14.

The embodiments of the invention in which an exclusive property or privilege is claimed are defined as follows:

1. A window receiving assembly for a window of a door and carried by a frame of the door where the window has an exterior and interior surface, the assembly comprising:
   a one-piece metallic channel of rolled metal having a corner bent to conform to the contour of the window and having a mounting surface for mounting to the frame and an inboard side wall and an outboard side wall projected from the mounting surface and away from the frame;
   the metallic channel defining a window receiving channel having an opening;
   the inboard side wall of the metallic channel having a first edge rolled into the window receiving channel defining a lip and the outboard side wall consisting of an upper portion in proximity to the mounting surface and a lower portion where the lower portion is rolled into the window receiving channel having the opening of the window receiving channel narrower than the mounting surface of the metallic channel;
   a plastic molding extruded to the lower portion of the channel forming a sealing surface for engaging the exterior surface of the window;

the sealing surface of the molding and the upper portion of the outboard side wall defining a space where the window receiving channel widens compared to the opening of the window receiving channel;

a filler co-extruded with the plastic molding on the metallic channel filling the space so that the channel on the outboard side wall does not widen as it goes from the opening of the window receiving channel to the mounting surface and adapted to allow the metallic channel to be bent to have the corner to conform to the contour of the window without distortion and said filler removed after bending to redefine the space; and a weather-strip having a retaining portion to be received in the space and a tongue to be received by the lip for securing the weather-strip to the metallic channel after the metallic channel is bent to the shape of the window and mounted to the frame of the vehicle whereby the weather-strip is adapted to provide a seal with the interior surface of the window and bias the window towards engagement with the sealing surface of the molding.

2. A window receiving assembly of claim 1 wherein a frame interface molding is extruded to the mounting surface of a glass run channel in the same process as the plastic molding and engages the frame.

3. A window receiving assembly of claim 1 wherein the plastic molding is a polyvinyl chloride and the filler is a polypropylene.

4. A window receiving assembly for a window of a door and carried by a frame of the door where the window has an exterior and interior surface, the assembly comprising:

a one-piece channel of rolled metal having a mounting surface for mounting to the door frame and inboard and outboard side walls projecting away from the mounting surface and spaced apart to define therebetween a window receiving channel;

a seal molding and a filler co-extruded onto the outboard side wall, the molding being molded onto the terminal portion of the wall and filler being molded onto the portion of the wall closer to the mounting surface and being of a plastic material not susceptible to permanent bonding to the metal of the channel and the molding so that the filler is removed from the channel and the molding subsequent to the bending of the channel to define a corner conforming to the contour of the window and thereby define a pocket between the channel and the molding; and a weather-strip having a retaining portion to be received in the pocket for securing the weather-strip to the metallic channel after the channel is bent to define the corner conforming to the contour of the window whereby the weather-strip is adapted to provide a seal with the interior surface of the window and bias the window towards engagement with the sealing molding.

* * * * *